United States Patent [19]

Janz

[11] Patent Number: 4,912,576
[45] Date of Patent: Mar. 27, 1990

[54] METHOD FOR WRITING A SERVO PATTERN

[75] Inventor: Donald W. Janz, Oklahoma City, Okla.

[73] Assignee: Magnetic Peripherals Inc., Minneapolis, Minn.

[21] Appl. No.: 284,134

[22] Filed: Dec. 14, 1988

Related U.S. Application Data

[63] Continuation-in-part of Ser. No. 932,814, Nov. 19, 1986, Pat. No. 4,811,135, and a continuation-in-part of Ser. No. 800,019, Nov. 20, 1985, abandoned.

[51] Int. Cl.$^4$ .............................. G11B 5/55; G11B 5/58
[52] U.S. Cl. .................................... 360/77.07; 360/31; 360/77.08; 360/75
[58] Field of Search .................... 360/31, 77.01, 77.02, 360/77.05, 77.06, 77.07, 77.08, 77.11, 75

[56] References Cited

U.S. PATENT DOCUMENTS 4,087,843  5/1978  Louis et al. ........................... 360/78
4,511,938  4/1985  Betts ..................................... 360/77

OTHER PUBLICATIONS

IBM-TDB, vol. 18, No. 10, Mar. 1976, Track Following Servo System, R. K. Oswald, pp. 3424-3425.
IBM-TDB, vol. 20, No. 1, Jun. 1977, Off-Track Gain Calibration of a Position Error Signal, R. S. Palmer, pp. 349-350.
IBM-TDB vol. 20, No. 5, Oct. 1977, Rotating Record Disk Initialization for Sector Servoing, J. C. Dennison et al., pp. 1789-1791.
IBM-TDB, vol. 20, No. 5, Oct. 1977, Phase and Location Coded Servo Pattern for Controlling the Magnetic Head in Track . . . , H. K. Schaller, pp. 1792-1794.

Primary Examiner—Steven L. Stephan
Assistant Examiner—David L. Robertson
Attorney, Agent, or Firm—Bill D. McCarthy; Edward P. Heller, III

[57] ABSTRACT

Servo data, distinguishable by phase, are stored in concentric servo tracks on a magnetic information storage disk. Each servo track includes a plurality of one type of servo pattern, with consecutive tracks arranged in a repeating sequence of the servo pattern types. For phase recognition, the pattern types further are arranged in a repeating sequence of angular sectors, each sector having a plurality of servo patterns. The servo patterns in a given storage track thus are always angularly offset from the servo patterns in the tracks adjacent thereto, permitting the use of servo patterns radially dimensioned to be greater than the separation distance between adjacent tracks, thereby increasing servo signal reliability and transducer dynamic range.

10 Claims, 13 Drawing Sheets

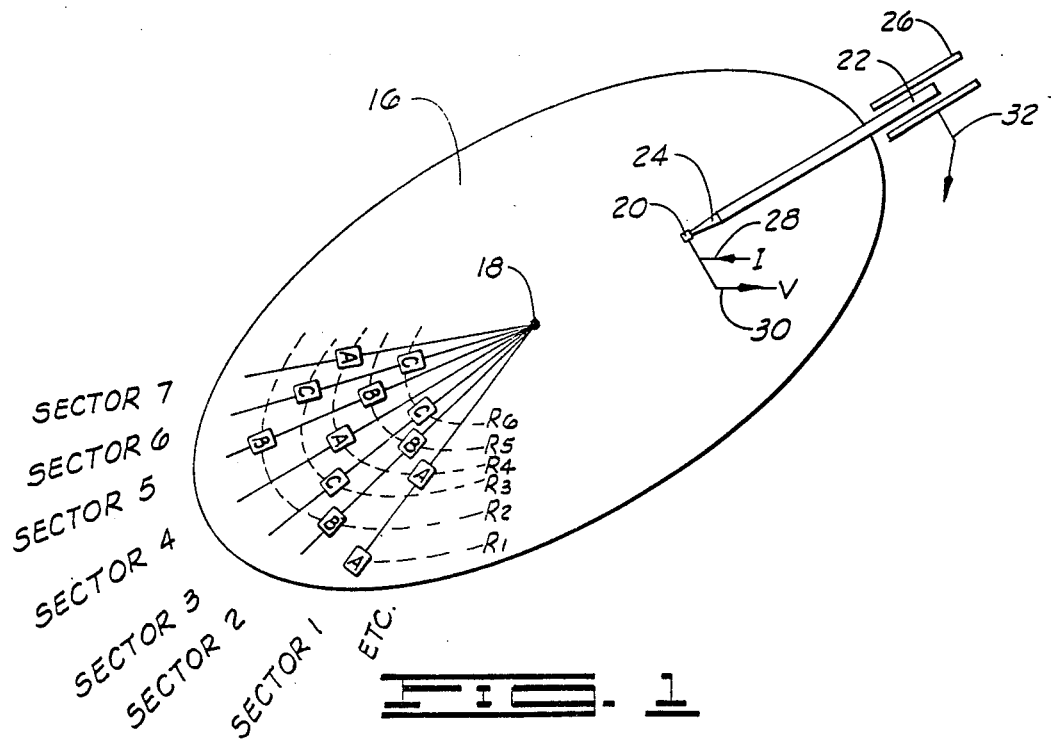
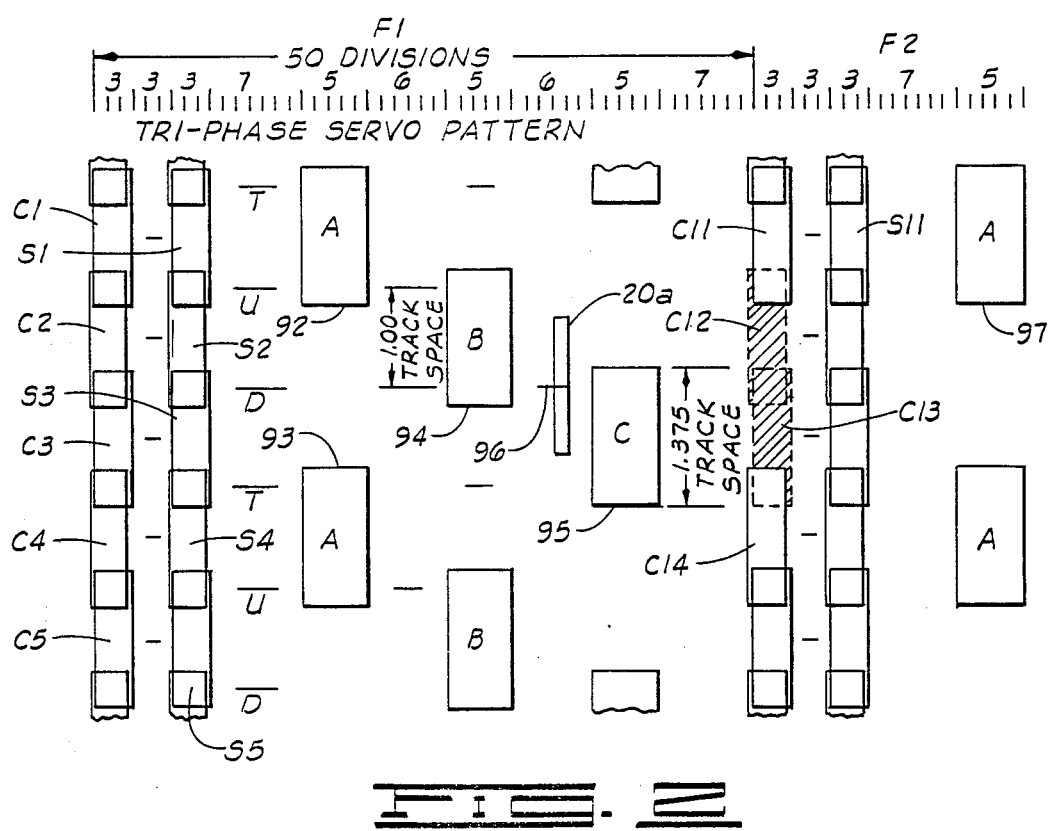

TRI-PHASE SERVO SIGNALS
FOR HEAD WIDTH =1.375 TRACK SPACE

TRI-PHASE SERVO ERROR SIGNALS
FOR HEAD WIDTH = 1.375 TRACK SPACE

TRI-PHASE SERVO AGC SIGNALS
FOR HEAD WIDTH = 1.375 TRACK SPACE

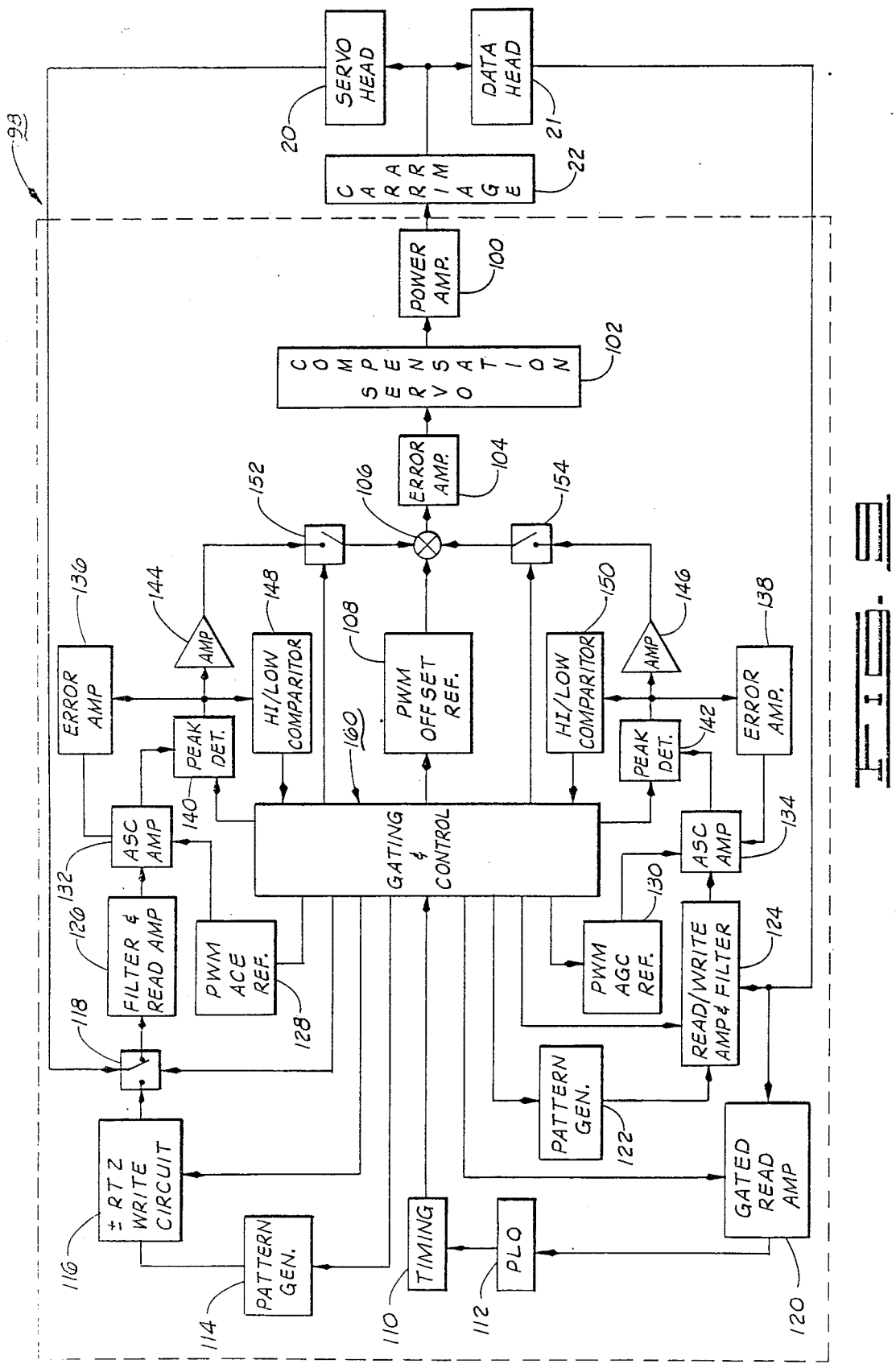

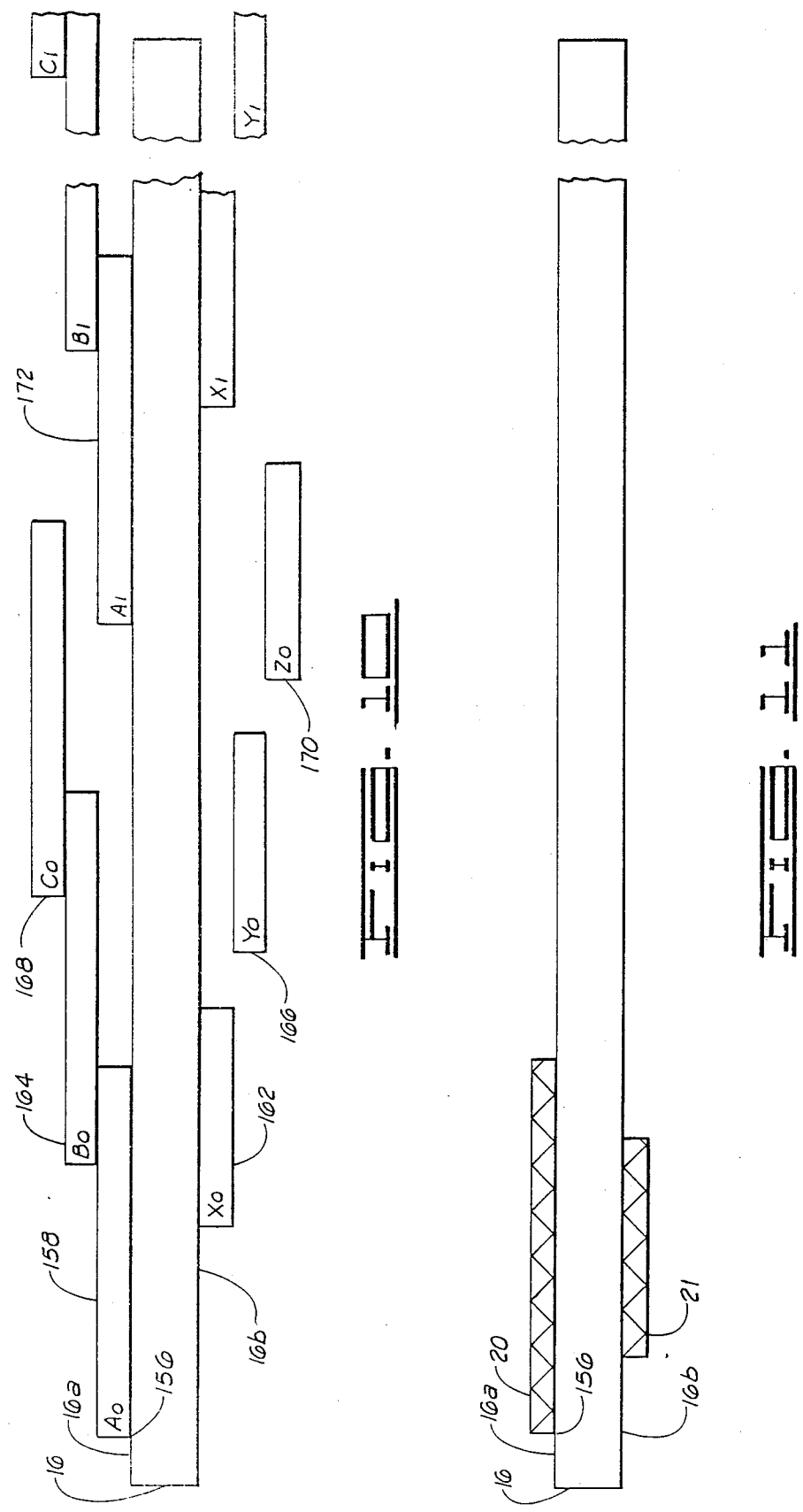

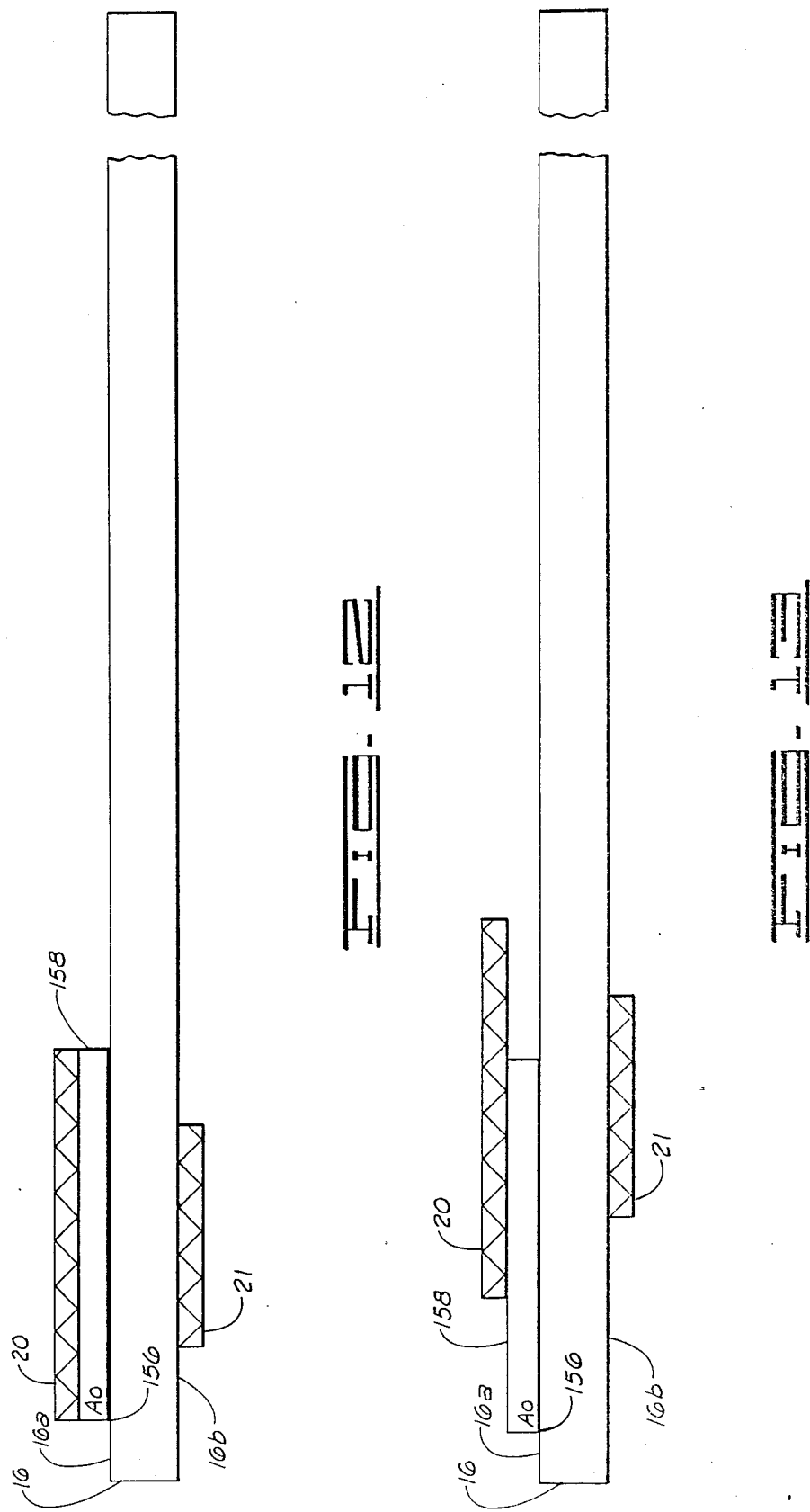

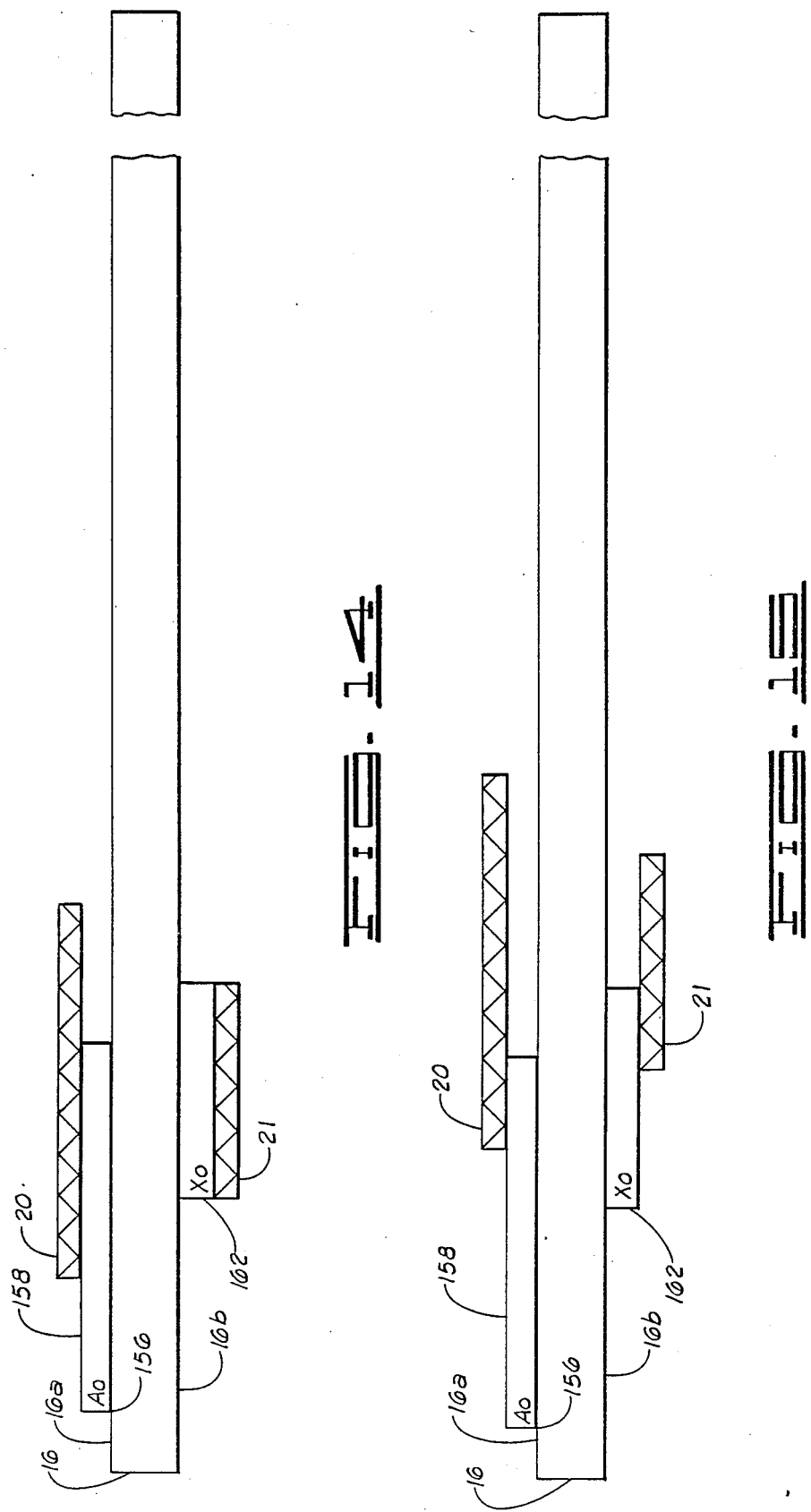

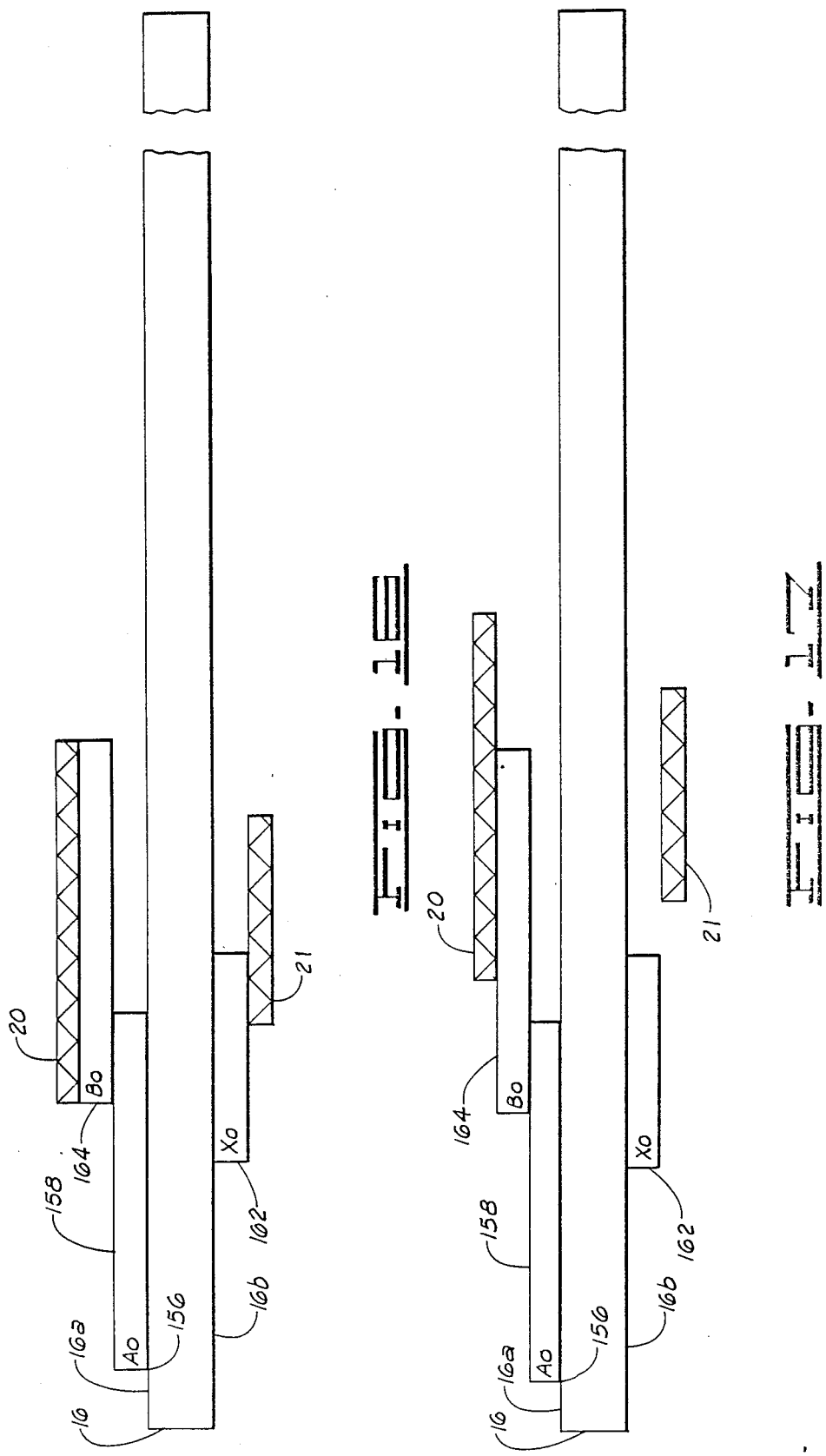

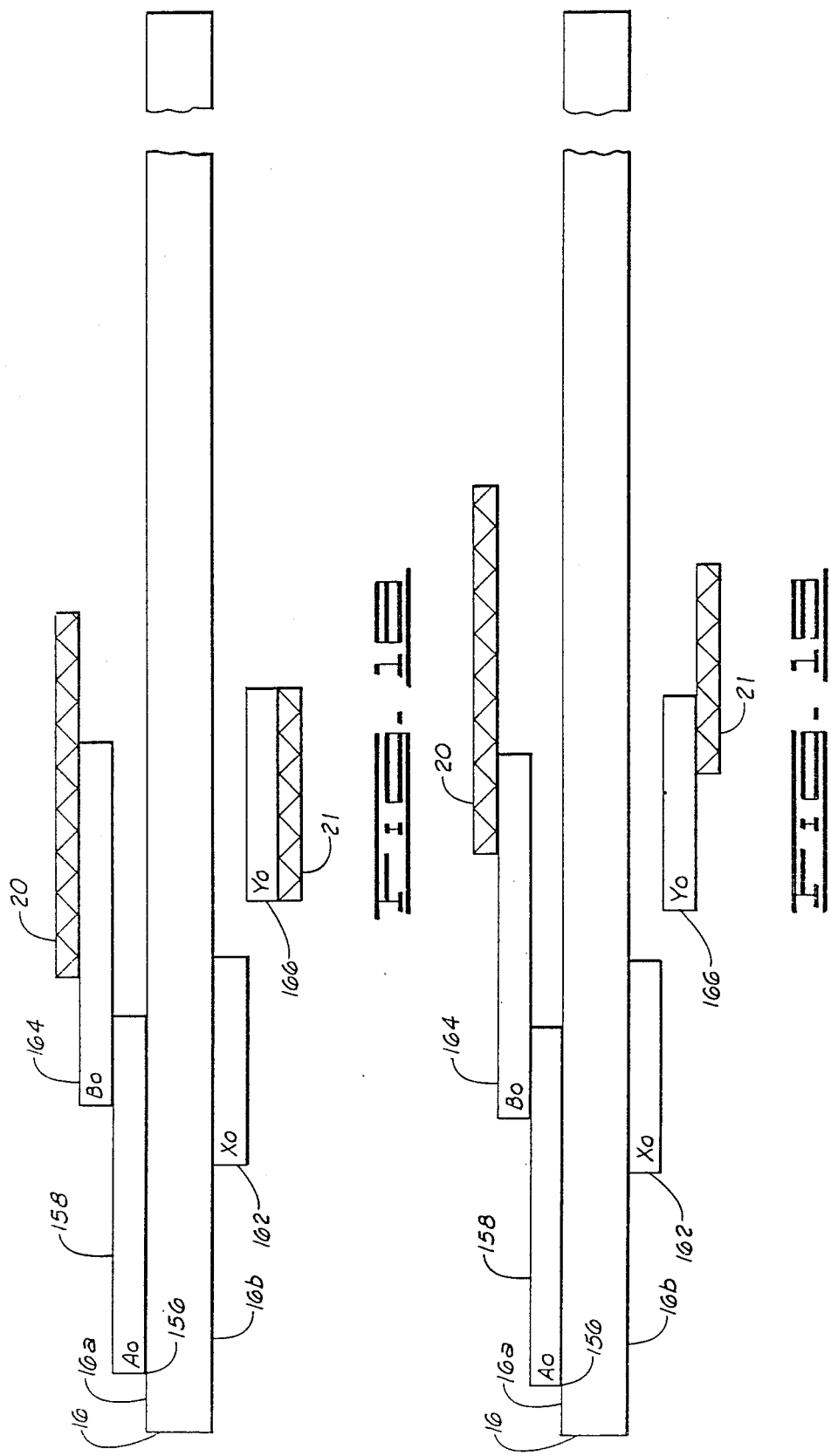

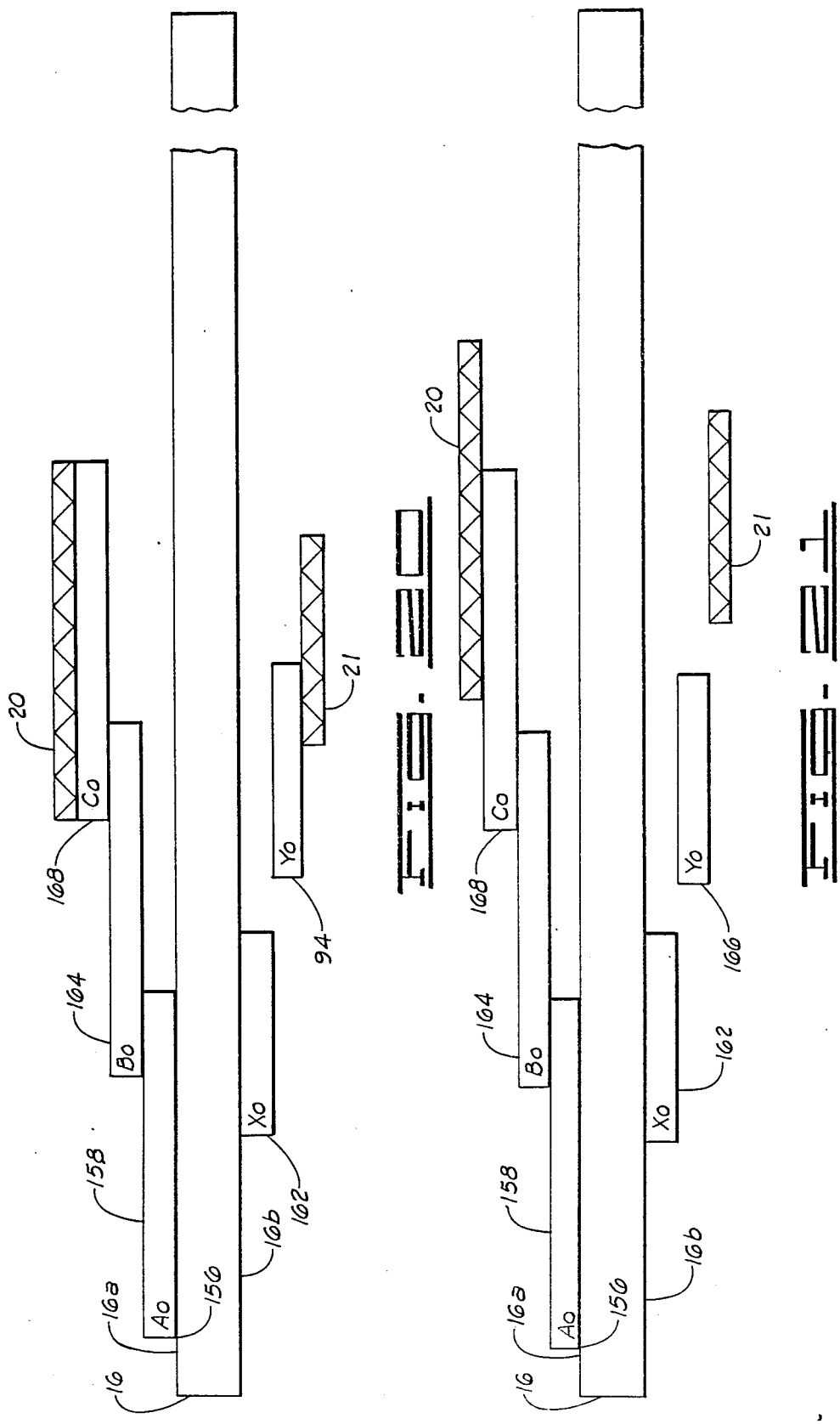

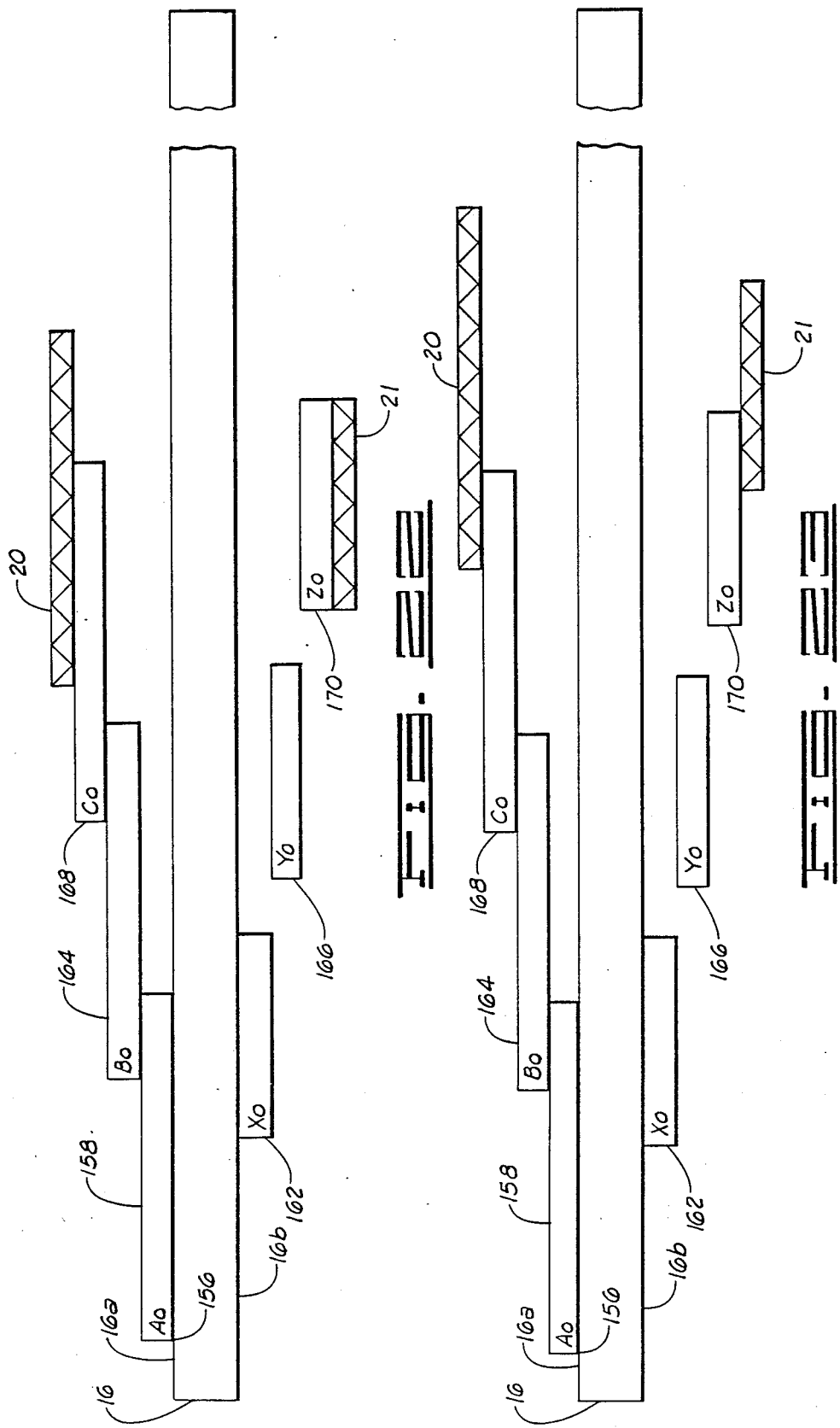

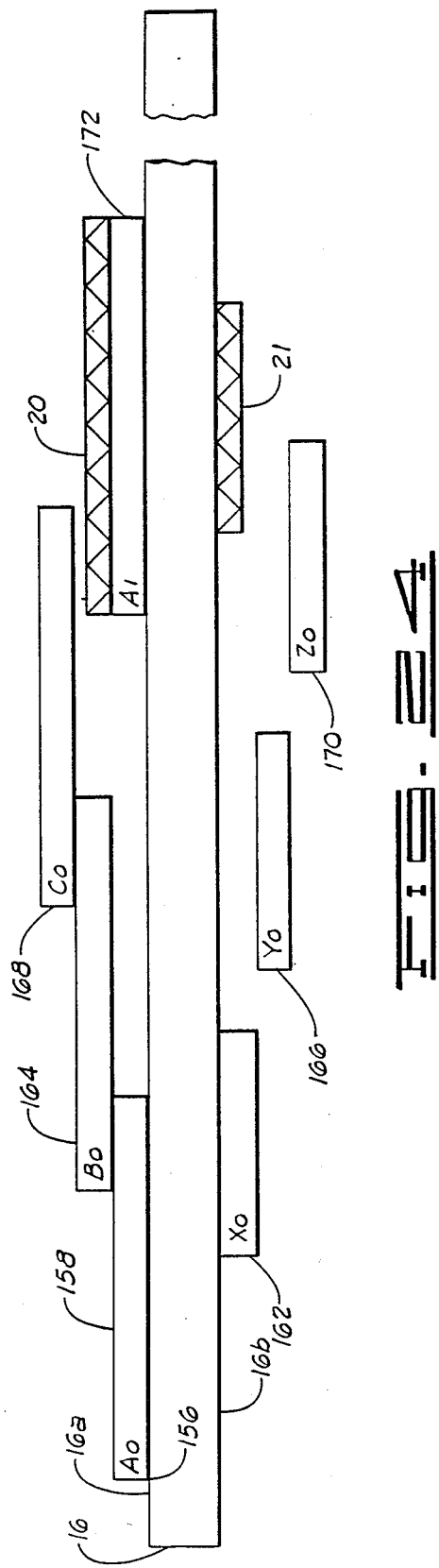

METHOD FOR WRITING A SERVO PATTERN

This application, entitled TRI-PHASE SERVO PATTERNS, is a continuation-in-part to U.S. application Ser. No. 932,814, filed Nov. 19, 1986, and now U.S. Pat. No. 4,811,135; and a continuation-in-part to U.S. application Ser. No. 800,019, filed Nov. 20, 1985, and now abandoned.

BACKGROUND OF INVENTION

1. Field of the Invention

This invention relates to magnetic storage devices using transducers or recording heads for reading, writing and erasing data on a movable magnetic storage medium. The data typically are arranged in parallel tracks such that the transducer follows an individual track as the storage medium is moved. For example, in a rotatable disk the data are arranged in concentric tracks with the transducer radially movable with respect to the disk.

2. Discussion of the Prior Art

As data density increases and the space between adjacent tracks is correspondingly reduced, it becomes advantageous to record transducer positioning or servo data on the recording medium, thus permitting more accurate positioning than is possible using exclusively mechanical means. An entire disk surface can be dedicated to servo positioning data, as shown in U.S. Pat. No. 3,864,740 to Sordello et al. granted Feb. 4, 1975. Alternatively, servo data can be written in sectors on the same medium surface containing the working data. This technique is called embedded servo and is disclosed in U.S. Pat. No. 3,185,972 to Sipple, granted May 25, 1965.

Transducer positioning using servo data is accomplished in two stages: coarse positioning or track seeking, in which the head is directed from a random location to a selected track; and fine positioning or track following, during which the transducer, already near the selected track, is maintained in a centered position with respect to the track. Preferably the servo data are divided into multiple frames of equal angular dimension, with servo information repeated in each frame. Also common is the use of sync bits, at least one in each track at the beginning of each frame. The sync bits signal entry into each frame, and establish automatic gain control (AGC) used in recognizing servo signals.

The continuing effort to place increased data on the same disk surface area raises problems of signal interference from servo patterns in tracks adjacent a desired servo track. Adjacent track interference can be reduced simply by reducing the radial dimension of each servo pattern, yet this reduces the dynamic range, meaning loss of a signal when the transducer is not sufficiently close to the servo track. Yet another problem, encountered when servo data is divided into angular frames, is the lack of phase coherence among the sync signals. This is due to the difficulty in placing sync signals from a given frame in exact angular alignment. The result of misalignment is unwanted modulation of the AGC signal.

It is therefore an object of this invention to enable reduced spacing between adjacent servo tracks without a corresponding reduction in the servo pattern radial dimension. Another object of this invention is to increase the signal quality and dynamic range of servo signals by increasing the width of servo patterns on a data storage medium. Yet another object is to provide servo patterns usable to establish an AGC signal, for more consistent AGC signals obtained from various tracks and frames on the storage medium. A further object of this invention is to provide servo information which is more accurately positioned in the radial dimension by electronically positioning same.

SUMMARY OF THE INVENTION

To achieve these and other objects, there is provided an apparatus for controlling the radial position of a transducer movable radially to a rotatable disk in a disk drive. The apparatus includes a magnetic disk, rotatable about an axis; a transducer; and a support assembly which supports the transducer proximate one surface of the disk and moves the transducer generally radially with respect to the disk. A plurality of first servo patterns on the disk surface form a first servo track generally centered on the axis. A plurality of second servo patterns form a second servo track radially offset from the first servo track. Each of the second servo patterns is angularly offset from one of the first servo patterns. A plurality of third servo patterns on the disk surface form a third servo track radially offset from the first and second servo tracks. Each of the third servo patterns is angularly offset from one of the first servo patterns and one of the second servo patterns. Rotation of the disk causes the servo patterns to move past the transducer, generating an electric signal in the transducer. The support assembly, responsive to the transducer signal, controls the radial position of the transducer.

Another feature of the present invention is an improved dedicated servo disk, including a disk which is rotatable about an axis. A series of first servo patterns form a first servo track on the disk which is centered on the axis. A second series of second servo patterns form a second servo track radially spaced apart from the first track. A series of third servo patterns form a third servo track on the surface radially spaced apart from the first and second tracks. The second servo patterns are angularly offset from the first servo patterns, and the third servo patterns are angularly offset from the first servo patterns and the second servo patterns.

Preferably the first, second and third servo patterns are arranged in a series of frames equal in angular dimension. A sync signal is placed in each of the servo tracks and near the beginning of each frame, with the first, second and third servo patterns distinguishable from one another based upon their angular distance from the sync signals.

The present invention further contemplates an improvement in servo information stored on an information storage medium. The medium has a surface adapted to assume either a first or a second condition. First surface portions of the surface are caused to assume the first condition in accordance with information stored on the medium. The remainder of the surface is caused to assume the second condition. The improvement comprises a first plurality of first surface portions arranged linearly in a longitudinal direction. A second plurality of first surface portions are arranged parallel to the first plurality of first surface portions and transversely spaced apart therefrom. A third plurality of first surface portions are arranged parallel to the first plurality of first surface portions, and transversely spaced from the first and second pluralities. The surface portions of each plurality are longitudinally offset from the surface portions of the other two pluralities.

Another aspect of the present invention is a process for writing servo information in substantially parallel tracks onto a magnetizable surface of a magnetic information storage medium. The process comprises the steps of: exposing a magnetizable surface of a magnetic storage medium to a first current level to cause the surface to assume a first magnetic polarity; exposing selected first portions of the surface to a second and opposite current level to form on the surface a first longitudinal array of first servo patterns having a second and opposite magnetic polarity; exposing selected second portions of the surface to the second current level to form on the surface a second longitudinal array of second servo patterns of the second magnetic polarity and parallel to the first array, and with the second servo patterns longitudinally offset from the first servo patterns; exposing selected third portions of the surface to the second current level to form on the surface a third longitudinal array of third servo patterns having the second magnetic polarity parallel to the first and second arrays, the third servo patterns being longitudinally offset from the first and second servo patterns; and repeating these steps until the surface contains a desired amount of servo information.

Preferably, each of the servo patterns is formed by moving the medium longitudinally with respect to a recording transducer positioned near the surface, and by supplying current at the second level to the transducer for a selected time, then immediately supplying current at the first level to the transducer for the selected time, and further by interrupting current to the transducer positioned near one of the longitudinal arrays whenever the transducer is approximately transversely aligned with one of the servo patterns in an adjacent longitudinal array.

Servo patterns in accordance with the present invention can be substantially wider in radial dimension than the nominal track-to-track separation. The result of enlarged servo patterns is increased amplitude servo signals for improved signal to noise ratio, thus increasing the dynamic range of the servo tracks. Alternatively, servo tracks may be positioned closer to one another without any sacrifice in dynamic range. Due to the angular offset, servo patterns in adjacent tracks do not directly overlap and interfere with one another, yet can form an overlapping pattern of servo signals which results in more linear AGC and thus enhanced servo data. Angularly offset servo patterns can be used, in lieu of or in addition to sync signals, to normalize the AGC signal. The result is a more consistent AGC signal and improved recovery from faulty sync signals. The three types of servo patterns generate peak signals having three separate phases, a feature which is advantageously used to measure transducer velocity directly from the phase signals. The tri-phase signals provide a difference signal, the slope of which provides direct velocity information, eliminating the need to integrate transducer actuator current or to use other velocity transducing equipment.

BRIEF DESCRIPTION OF THE DRAWINGS

These and other features and advantages of the invention will become apparent upon reading the following detailed description and claims, and upon reference to the drawings, in which:

FIG. 1 is a schematic representation of a magnetic information storage disk with servo patterns positioned thereon in accordance with the present invention;

FIG. 2 is an enlarged schematic representation showing a surface portion of the disk of FIG. 1;

FIG. 9 is a block diagram for circuitry used in making another alternative embodiment of the present invention; and FIG. 10 through FIG. 24 are diagrammatic representations of various stages in the positioning of servo patterns and data patterns on a magnetic information storage disk in accordance with the present invention.

DETAILED DESCRIPTION

Figure 3:
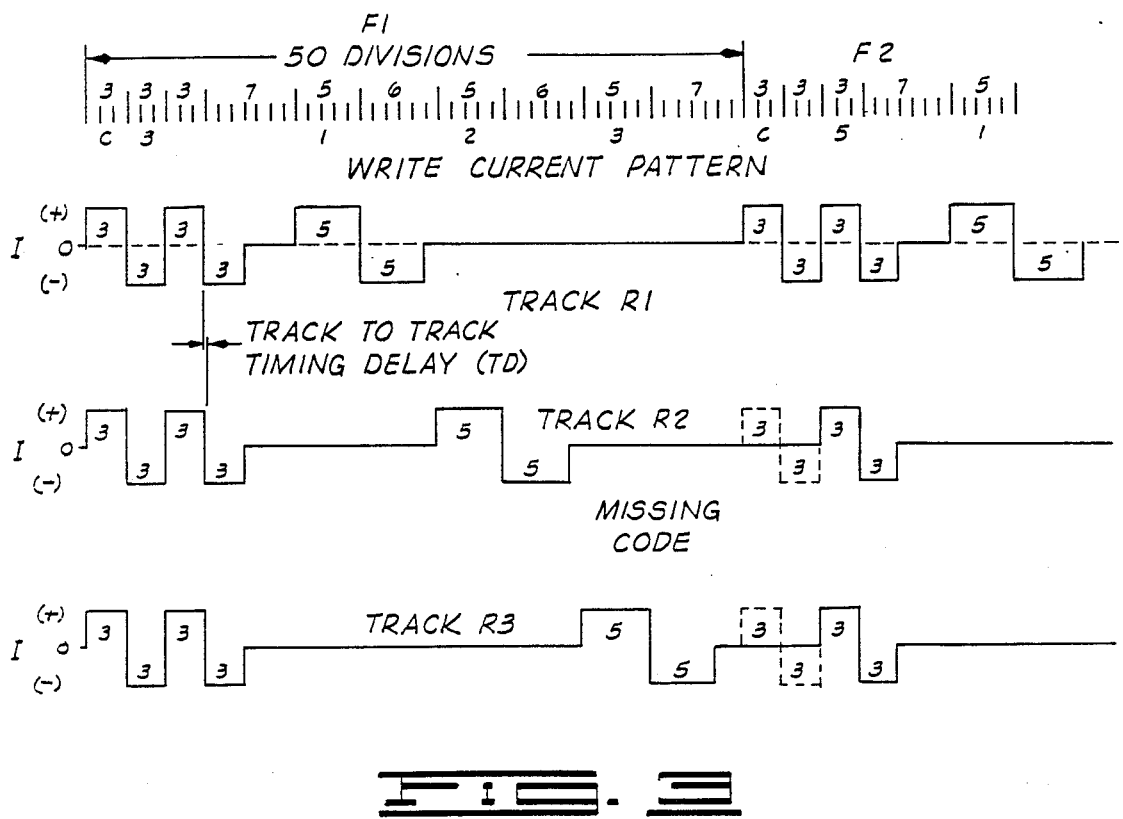
FIG. 3 is a timing diagram corresponding to the disk surface portion of FIG. 2 illustrating the writing of servo information on the disk.

In the drawings, there is shown in FIG. 1 a magnetic information storage disk 16 rotatable about a central axis 18 by means of a disk drive, not shown. Disk 16 is a "dedicated servo" disk, and contains no working data only servo data.

Certain parts of a magnetic disk drive are depicted in FIG. 1 to illustrate the writing of information on the upper surface of disk 16 and the subsequent reading of such information. These parts include a read/record transducer 20. The transducer 20 is mounted to a movable carriage 22 by means of a support arm 24. A voice coil 26, mounted to the drive, supports carriage 22 for linear movement toward and away from axis 18, thus moving transducer 20 radially with respect to the disk 16. Typically, carriage movement and position are controlled through controlling electrical current to the voice coil 26. By varying the transducer radial position and by rotating disk 16 with a drive motor (not shown), information may be written at any desired location on the surface of the disk 16.

Servo information is written on disk 16 by introducing an electrical current I to the transducer 20 through a first line 28, with the transducer 20 positioned over a selected portion of the disk surface 16. The transducer 20 also is adapted to read information previously written on the disk 16, generating an electrical signal as represented by voltage V in a second line 30. As indicated by a third line 32, voltage V is an input to voice coil 26. Responsive to the V input, and to a source of velocity commands (not shown), the voice coil 26 either moves the carriage 22 or maintains it substantially stationary in order to control the radial position of the transducer 20.

Shown on part of the surface of the disk 16 are six servo groups, R1 through R6, radially and uniformly spaced apart from one another and generally concentric about the axis 18. Each of the groups R1 through R6 can be a separate ring, or all of these groups can be part of a continuous spiral group, there being a selected index or angular position on the disk 16 as a cutoff point between a group and the next subsequent group.

Three types of servo pattern groups, labelled A, B and C respectively, are written on the disk 16 during formatting, and need not be rewritten during normal operation. Servo pattern groups R1 and R4 contain only type A servo patterns; servo pattern groups R2 and R5 contain only type B servo patterns; and servo pattern groups R3 and R6 contain servo patterns only of type C. It should be understood that this sequence of servo pattern groups A, B and C is repeated for the desired number of servo tracks on the disk 16, typically in the hundreds or thousands.

Servo patterns groups A, B and C are further arranged angularly in sectors and radially in groups, such as represented by radii sectors 1 through 7. Sectors 1, 4 and 7 contain only type A servo patterns; sectors 2 and 5 contain only type B patterns; and sectors 3 and 6 contain only type C patterns. This sequence of A, B and C servo patterns is repeated through the entire revolution of disk 16. Servo patterns A, B and C thus are radially and angularly offset from one another, and are arranged in a repeating sequence both in the radial and angular directions. Each individual A, B and C servo pattern written by the transducer 20 can be read by the transducer 20 at a later time for purposes of indicating radial position of the carriage 22 on the disk 16.

As understood by those skilled in this art, a transducer writing on a disk produces individual patterns whose physical width, measured along a disk radius, is related to the width of the flux gap of the transducer itself, also measured along a radius and usually approximately equal to the physical width of the flux gap of the transducer. During reading, the transducer produces a signal whenever a pattern passes beneath it. The strength of that signal is approximately proportional to the radial width of the portion of the transducer flux gap beneath which the pattern sweeps. Thus, if the pattern sweeps beneath 40% of the gap width, the level of the signal generated by the winding of the transducer will be approximately 40% of the level generated by a pattern sweeping beneath all of the width of the transducer flux gap. Thus, the signal level from the transducer is a measure of its alignment with a particular pattern. In general, the apparent width of the transducer flux gap when reading substantially equals the transducer flux gap when writing, and each of these transducer flux gaps is substantially equal to the physical width of the transducer itself.

Continuing with the present invention, it should be noted that each group of consecutive radii containing A, B and C servo patterns forms one of a series of substantially identical data frames F. One such Frame F1, and a portion of the following Frame F2, is shown in FIG. 2, which is an enlargement of a selected portion of the surface of the disk 16. At the leading edge of the frame F1 is a column of overlapping code bits C1, C2, C3, C4 and C5 corresponding to servo tracks R1 through R5. Spaced angularly from the code bits is a column of sync bits S1, S2, S3, S4 and S5. Neighboring code and sync bits overlap one another, and are slightly angularly displaced from one another and lack phase coherence as mentioned above.

The code bits, such as C1 through C5, are used to indicate an index (a specific angular location) and to indicate the innermost and outermost servo tracks. For example, an index can be marked by intentionally avoiding writing code bits, as indicated at code bits C12 and C13. Sync bits, such as S1 through S5, contribute to establishing the level for automatic gain control (AGC), and the sync bits enable differentiation between servo patterns A, B and C based on the difference in phase or angular locations of same.

Each data frame F is segmented into 50 equal divisions. The lead edge of each servo pattern A is approximately seven divisions distant from the trailing edge of its associated sync bit (e.g., S1 of S4). The leading edge of each servo pattern B is separated from the trailing edge of its corresponding sync signal by approximately eighteen divisions, while the distance between the leading edge of each servo pattern C and the end of its associated sync bit is twenty-nine divisions. This difference in separation is sufficient to avoid any overlap between the patterns in adjacent servo groups. As a result, the electrical signal generated by the transducer 20, when positioned over the rotating disk 16, can be recognized as a signal of three separate phases, one phase corresponding to each type of servo pattern.

It should be noted that the angular offset enables servo patterns A, B and C to have a radial dimension wider than the corresponding radial distance between servo track centers. In this instance the servo pattern width is equal to 1.375 times the track space, though the optimal pattern width can vary with the specific application. The use of these wider servo patterns has improved signal amplitude about 43 percent, and this increase in signal amplitudes provides improved accuracy in the positioning of transducer 20.

FIG. 2 also shows on the frame F1 the projection 20a of the flux gap of the transducer 20 which reads and writes the servo patterns with relative movement from left to right on the medium. The gap projection 20a represents the physical width of the transducer 20 and is substantially equal in radial width to each servo, sync and code pattern as originally written. The gap projection 20a represents transducer 20 which has just swept past B pattern 94 at a radial position which generates a signal the level of which is approximately 65% of maximum in that approximately 65% of the gap width passed over B pattern 94. The transducer 20 as depicted by projection 20a is positioned to continue its motion by sweeping next across C pattern 95. By comparing the appropriate two signal levels the control system can determine the radial movement of transducer 20 necessary to center it on a desired track. In fact, the gap projection 20a is shown radially positioned so as to allow C pattern 95 to sweep past about 65% of the width of the transducer 20.

With the two signals thus generated by B pattern 94 and C pattern 95 nearly equal, the transducer 20 is by definition centered on a track centerline indicated by the D hash mark 96. By selecting different pair combinations of radially adjacent A, B and C patterns for comparison, and shifting transducer 20 to equalize the signal levels from each pattern type in the pair, the transducer 20 can be centered on any desired track. Each such track is radially spaced from its neighbors by the original radial spacing of adjacent A, B and C pattern groups. The individual A, B and C pattern signals can be identified by the time which elapses from the sync bit signal to the A, B or C pattern signal, the times for each of the three types being different from each other. Thus, the transducer 20 can have a width or radial dimension greater than the individual track spacings and yet be capable of both writing and reading the individual A servo patterns 92, 93, etc. Further, each radially aligned pattern group, i.e., all patterns at the same nominal radius, in conjunction with a radially adjacent group, define a single servo track. Thus, the number of pattern groups plus one equals the number of servo tracks.

FIG. 3 depicts how direct current is introduced to the transducer 20 while the disk 16 is rotated in order to write servo patterns A, B and C on the disk 16. The writing of servo pattern groups R1, R2 and R3 is illustrated. In each case, as disk 16 is rotated over the desired servo pattern location, transducer 20 is subjected to one of three levels of the direct current; a positive level, a substantially equal but negative level, and a zero level equivalent to the absence of any current. The whole surface of disk 16 is first subjected to the negative current level to cause it to assume a first magnetic state or condition, e.g., "north". Each code bit and each sync bit then is written with positive current over three angular divisions, followed immediately by negative current over three angular divisions. In each case, it is the three divisions of positive current which actually form the bit, by causing the surface portion to assume a second and opposite magnetic state, e.g., "south". The trailing three divisions of negative current serve to balance the positive current and avoid magnetization of the transducer 20.

Servo patterns A, B and C also are written with positive current, followed by negative current for an equal number of divisions. In FIG. 3, this number of divisions is five, although this is not critical. The zerolevel of current is applied whenever the transducer 20, when writing track R2 for example, is angularly aligned with either servo pattern A in track R1 or with servo pattern C in track R3. Thus, interference with neighboring tracks during writing is avoided.

The broken lines in tracks R2 and R3 indicate where code bits are intentionally not written in order to mark an index, corresponding to the cross hatched areas C12 and C13 in FIG. 2. The track-to-track timing delay is an unwanted consequence of the inability to exactly align the sync and code bits as previously explained.

Figure 4:
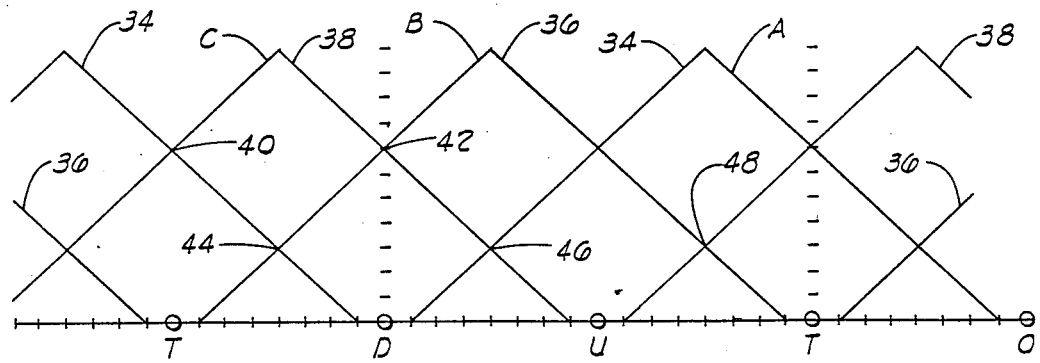
FIG. 4 is a graphical representation of the signals generated by the servo patterns.

FIG. 4 shows peak voltage levels, generated by a series of servo patterns passing by the transducer 20 when disk 16 rotates. A first peak voltage signal 34 is generated by servo patterns A, a second peak voltage signal 36 is generated by servo patterns B, while a third peak voltage signal 38 is generated by type C servo patterns. The peak voltage signals 34, 36 and 38 are shown over a radial traverse of the transducer 20 covering four data tracks labelled T, D, U, and again T to show the beginning of the next sequence. Each data track is radially located midway between its two most adjacent servo tracks. Also, as disk 16 is dedicated to servo data, tracks T, D and U are on a different disk. Thus, the proper centering of a data head on a data track corresponds to the positioning of transducer 20 equidistant from the two adjacent servo groups.

When the transducer 20 is positioned midway between adjacent servo groups, the voltage level of signals from the tracks are equal. This is graphically represented by a series of comparison or "null" points, one corresponding to each of data tracks T, D and U. For example, when a data head is centered on track T, peak voltage signal 34 generated by servo patterns A equals the peak voltage signal 38 generated by servo patterns C as indicated at null point 40 in FIG. 4. Likewise, with the data transducer centered at track D, peak voltage signals 36 and 38 generated by servo patterns B and C are equal, at null point 42.

Three additional comparison points at 44, 46 and 48 are generated when transducer 20 is located directly on a servo pattern group. That is, with the transducer 20 directly over a servo pattern group consisting of type B servo patterns, the peak voltage signals 38 and 34 of servo patterns C and A are equal.

Figure 5:
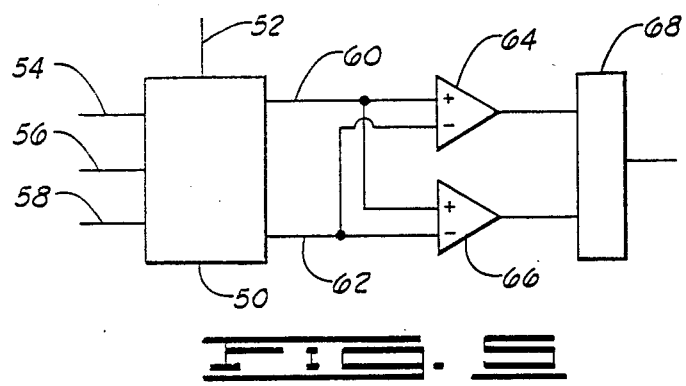
FIG. 5 is a schematic representation apparatus illustrating the recovery of information using the signals in FIG. 4.

The tri-phase servo signals can be selectively compared and accumulated in order to control the position of the transducer 20, as illustrated in FIG. 5. A pulse detector 50 has four inputs: a clocking input 52, a type A input 54 corresponding to peak voltage signal 34, a type B input 56 corresponding to second peak voltage signal 36, and a type C input 58 corresponding to peak voltage signal 38. The pulse detector 50 has two outputs 60 and 62 corresponding to selected pairs of inputs 54, 56 and 58.

The clocking input 52 generated by sync patterns S1, S2, etc. enables the selection of a pair of inputs 54, 56 and 58 as the pulse detector outputs. Of the three phases of incoming signals 34, 36 and 38, the two phases of the desired pair are selected in accordance with the selected data track location. For example, for data track U (FIG. 4) the inputs selected are 54 and 56 corresponding to peak voltage signals 34 and 36 generated by type A servo patterns 92, 97, etc. and type B servo patterns 94, etc., respectively.

The pulse detector outputs are compared in a subtracting amplifier 64, and accumulated in a cumulative amplifier 66. Both amplifier outputs are fed to a microprocessor 68 (or an integrated circuit) which generates movement and velocity commands to the voice coil 26 (FIG. 1) in order to control the position of the transducer 20.

Figure 6:
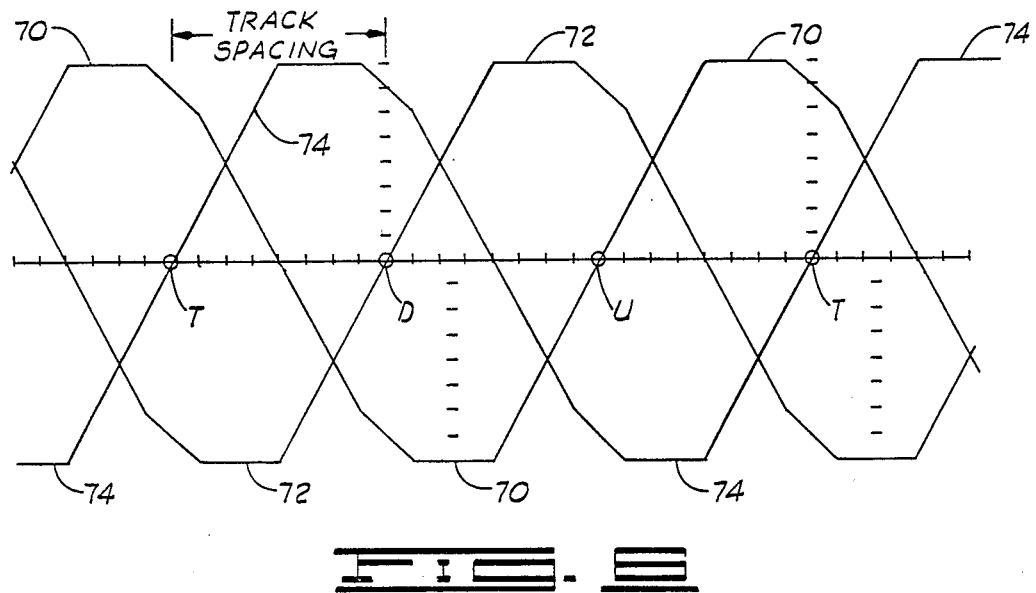
FIG. 6 is a graphical representation of difference signals obtained by comparing selected pairs of the signals in FIG. 4.

FIG. 6 shows the difference signals provided to the microprocessor 68 by the subtracting amplifier 64 over a radial transducer displacement corresponding to that shown in FIG. 4. Difference signals 70, 72 and 74 are all peak voltage levels. Difference signal 70 represents the difference between signals 34 and 36; difference signal 72 represents the difference between signals 36 and 38; and difference signal 74 represents the difference between signals 38 and 34.

When the transducer 20 is within one half track of the location corresponding to data track U, inputs 54 and 56 are selected as the pulse detector output and amplifier 64 supplies the difference signal 70 to the microprocessor 68. In similar fashion, the difference signal 74 is the output of the amplifier 64 when the transducer 20 is within a half track spacing of data track T; and the difference signal 72 is the amplifier output whenever the transducer 20 is within a half track of data track D.

The resultant signal is a sawtooth wave, inclining upwardly and to the right in FIG. 6, having a zero value at the center of the corresponding data track, then experiencing a sharp vertical drop as the transducer 20 approaches the next data track. Transducer radial velocity can be derived by differentiating this sawtooth wave with respect to time, disregarding the vertical drop when switching between successive signals (midway between zero points).

Transducer radial velocity is derived directly from the difference signal, the slope of which varies linearly with velocity. As the slope of the sawtooth wave is always positive when moving rightward as viewed in FIG. 6 (disregarding the instantaneous vertical drop corresponding to crossing each servo track), velocity can be derived directly from the slope of the difference signal. There is no need for the less reliable approach of integrating transducer actuator current, or for any additional velocity transducing equipment.

Figure 7:
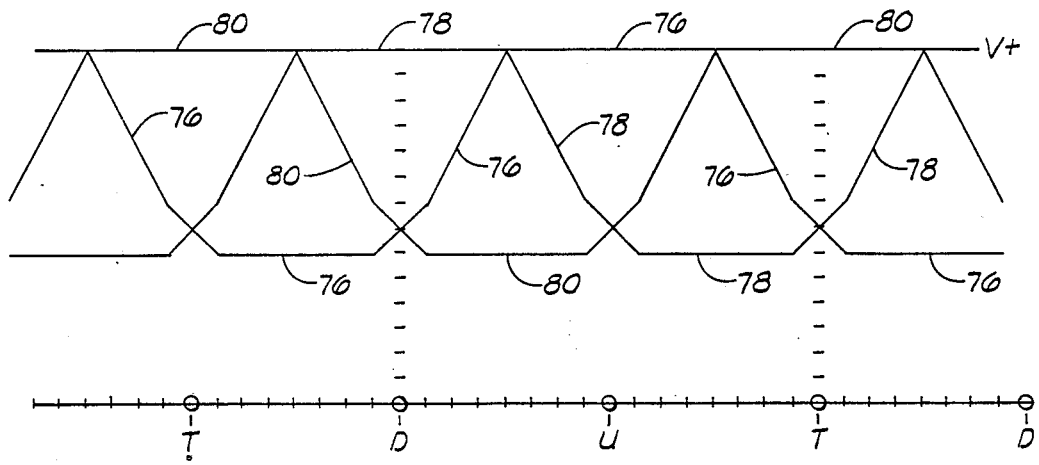
FIG. 7 is a graphical representation of summing signals obtained by combining selected pairs of the signals in FIG. 4.

FIG. 7 shows three cumulative signals: a signal 76 obtained by adding the peak voltage signals 34 and 36 in FIG. 4; a cumulative signal 78 obtained by adding the voltage signals 36 and 38; and a cumulative signal 80 obtained by the addition of the voltage level signals 34 and 38.

As was the case in connection with subtracting amplifier 64, the pulse detector outputs fed to the cumulative amplifier 66 are controlled by the radial location of the transducer 20. For example, when the transducer 20 is within one half track space of data track U, the pulse detector inputs 54 and 56 are selected, producing an output of the amplifier 66 corresponding to the sum of the peak voltage signals 34 and 36. The effect of sensing selected pairs of inputs 54, 56 and 58 in accordance with the particular data track traversed is a straight line V+ indicating a constant voltage level. When used to establish the AGC level, V+ is a substantial improvement over the sync signal. Because the corresponding servo patterns A, B and C are angularly offset, there is no overlapping of adjacent servo patterns and no problem with the sync bit track-to-track timing delay illustrated in FIG. 3.

Figure 8:
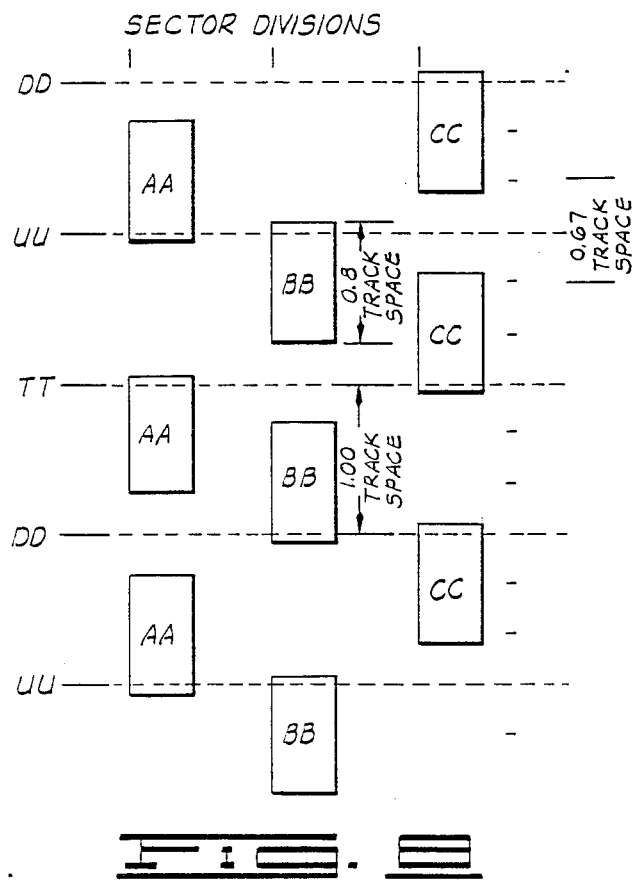
FIG. 8 shows an alternative embodiment of the present invention.

FIG. 8 is equivalent to FIG. 2, but illustrates an embodiment in which the width of servo patterns AA, BB and CC is less than the separation distance between adjacent data tracks. There are two servo tracks for each data track. The advantages of angular offset are still achieved, with the additional advantage that servo patterns AA, BB and CC can be written with the same transducer that writes working data signals. This is an advantage particularly in connection with embedded servo, where servo and working data are written on the same surface. Servo data then appear in bursts of the repeating sequence.

Another embodiment of the present invention is illustrated in FIGS. 9 through 24. In this embodiment the servo information is again laid on concentric tracks on a servo side 16a of the disk 16 (not shown in FIG. 9), but a more accurate method of positioning the transducer 20 is used. The mechanical linkage (not shown) is disconnected from the transducer 20 and positioning circuitry 98 (shown in FIG. 9) is adapted and interfaced to the carriage 22 so that the transducer 20 in combination with associated positioning apparatus (such as the carriage 22 and the positioning circuitry 98) is electronically responsive to position commands as described hereinafter.

The purpose of using the positioning circuitry 98 of FIG. 9 in combination with the carriage 22, rather than a mechanical linkage, is to obtain greater accuracy in laying the tracks. The tracks are laid by a process that involves writing servo information on one side of the disk and data information on the other side.

In the preferred process, servo information is laid on the servo side 16a of the disk 16 and then data information is laid one-half track radially inward on an opposing data side 16b of disk 16. Servo information of a second phase is then laid on the servo side 16a, one complete track space from the information of the first phase. Data information of a second phase is then laid on the data side one-half track radially inward from the position of the second phase servo information. Servo information of a third phase is then laid on the servo, side 16a one-half track radially inward from the position of the second phase data information. Data information of a third phase is then laid on the data side 16b one-half track radially inward from the third phase servo information. Servo information of the first phase is then written on the servo side 16a one-half track radially inward from the third phase data information; then data information of the first phase is written; and next, servo information of the second phase is written, each being progressively one-half track further radially inward until both sides of the disk 16 are covered, with servo information and data information, respectively. As discussed hereinabove, the phases of information are angularly offset so as not to interfere with one another.

When the desired number of servo tracks has been written on the servo side 16a of the disk 16, the process is completed. However, if the desired number of servo tracks has not been written (either too few or too many) the radial track width will be recalculated, the servo information and the data information DC erased, and the entire process repeated as another cycle of writing servo and data information. The cycle is then repeated with the new track width, and if the desired number of servo tracks is still not achieved, the track width is again recalculated and the cycle repeated iteratively until the desired number of servo tracks is achieved on the servo side 16a. Once the process is completed, the disk 16 will have three phases of servo information on the servo side 16a and three phases of data information on the data side 16b, as depicted in FIG. 10. Only two groups of each of the three patterns of both servo and data information have been shown for ease of illustration, but the reader can imagine the disk 16 actually being filled with hundreds or thousands of tracks of such information. When the desired number of servo tracks has been written, the data information is all DC erased so that the data side of the disk is available for use by the consumer. The servo information remains on the servo side 16a of the disk 16 and is used as hereinabove described for transducer positioning.

Referring to FIG. 9, a positioning circuit 98 is shown interfaced with the carriage 22 and the transducer 20 (sometimes also referred to herein as the servo head 20) and a data head 21. The disk 16 is not shown in FIG. 9, but it should be understood that the servo heads 20, 21 are in close proximity to the disk 16. The positioning circuitry 98 is used only for this alternative process and is not a permanent part of the final product head disk assembly; therefore, greater accuracy may be required with regard to its components. Accuracy of at least 0.1 percent in all components of the positioning circuitry 98 is desirable and preferred.

The positioning circuit 98, in combination with the carriage 22 and the servo head 20 and data head 21, is used to perform the hereinabove described process. The carriage 22 receives an impulse signal ultimately from a power amp 100, as opposed to the carriage 22 being moved by the mechanical linkage (not shown) in the previously described embodiments of the invention. While the positioning circuit 98 is depicted schematically in FIG. 9, some of the elements of the positioning circuitry will be referred to in the more elaborate description of the process which immediately follows. Other similarly functioning circuits will suggest themselves to those skilled in the art.

The operation of the positioning circuit 98 will become clear once the components of same are designated, which are as follows:

102 is a servo compensation unit for generating position commands;

104 is an error amplifier;
106 is a summing point;
108 is a pulse width modulation offset reference element;
∠ is a timing element;
112 is a phase-locked oscillator;
114 is a pattern generator;
116 is a return to zero circuit;
118 is a switch;
120 is a gated read amplifier;
122 is a pattern generator;
124 is a read/write amplifier and filter;
126 is a read amplifier and filter;
128 is a pulse width modulation automatic gain control reference element;
130 is another pulse width modulation automatic gain control reference element;
132 is an automatic gain control amplifier;
134 is another automatic gain control amplifier;
136 is an error amplifier;
138 is another error amplifier;
140 is a peak detector;
142 is another peak detector;
144 is an amplifier;
146 is another amplifier;
148 is a high/low comparator;
150 is another high/low comparator;
152 is a switch; and
154 is another switch.

Referring now to FIGS. 9 through 24, the initial step of the process is to bias the carriage 22, the servo head 20 and the data head 21 against an outer mechanical stop 156 of the disk 16 (FIGS. 11–24) after the servo side 16a surface has been DC erased. This process could also be performed from inner diameter to outer diameter, but the preferred method is to start at the outer diameter. The data side 16b can also be erased. The next step is to establish the servo sync clock (not shown) and index a reference on the data side 16b of the disk 16. The next step is to write a set of servo information $A_0$ 158 at the outer stop 156 (servo track 0) on the servo side 16a as shown in FIG. 12.

A plurality of phases of both servo information (designated A, B, C) and data information (designated X, Y, Z) are used in this process. The typical number of phases will be three. It will be understood that the different phases are graphically stacked in FIGS. 10 through 24 to diagrammatically indicate angularity on the surfaces of the disk 16, and that each information symbol represents all sectors at that particular radial position. Further, the relative dimensions of the information patterns and the disk 16 are not to scale.

Servo and data information are laid with various proportions of gap widths (corresponding to the radial dimension of the transducer) and the pattern widths (corresponding to the radial dimension of the information patterns). For example, the servo information usually has a larger gap width and can have a larger pattern width than the data information, but alternatively, the data information can utilize a larger gap width and pattern width or dimensions equal to those of the servo information. Preferably, the servo side transducer gap width is 1.375 the size of the track spacing, and the data side transducer gap width is 0.8 the size of the track spacing or smaller (one pattern width or less).

The servo $A_0$ signal is read back and a servo automatic gain control level is set to 2.2 volts on the servo $A_0$ signal and hold the servo automatic gain control level. It should be noted that the voltage levels cited herein are exemplary in nature, as are the pattern and gap widths. Other dimensions could be used to equally good effect.

The data head 21 is now moved one-half track radially inwardly as shown in FIG. 13. (Of course since the servo head 20 and data head 21 are disposed in the same radial position, the servo head will also move one-half track on the opposing servo side 16a of the track.) The step of moving the carriage 22 one-half track will now be described in detail, and though such detail will not be used again, it should be understood that subsequent steps in the process involve substantially similar details. The carriage 22 moves the data head 21 via an offset signal. A control element 160 (e.g. a microprocessor) generates an ideal offset voltage value which is equal to the proportion of the $A_0$ signal which is read when the servo head 20 has moved a half track radially inward from the position where the servo information $A_0$ 158 was written.

The ideal offset voltage value is summed with the actual voltage reading of the $A_0$ signal. That is, the servo head 20 moves slowly radially inwardly and a constantly decreasing actual $A_0$ voltage reading is generated. The offset signal is the result of the summing of the two values. As long as the offset signal is nonzero, the offset signal will continue to move the carriage 22. Once the offset signal is zero, the carriage 22 stops moving and the control element 160 will check whether the actual voltage reading of the $A_0$ signal corresponds exactly to a one-half track displacement (whether the heads have actually moved one-half track).

By way of illustration, it will be assumed that the servo head 20 is 1.375 times as long as the desired track width, and that the data head 21 is 0.8 times as long as the desired track width. Further, it is assumed that a full reading of a servo pattern has a value of 2.2 volts, and that a full reading of data pattern has a value of 1.28 volts (0.8 track width times 2.2 volts divided by 1.375 track width). The full reading of servo information $A_0$ 158 is 2.2 volts (the automatic gain control was set at 2.2 volts). When the servo head 20 has been displaced one-half track radially inwardly, the servo head 20 will read a voltage of 1.4 volts as in FIG. 13: 0.5 track width times 2.2 volts divided by 1.375 track width equals 0.8 volts; 2.2 volts (full reading) minus 0.8 volts (a half track displacement) equals 1.4 volts (half track displacement reading). The ideal offset voltage value will therefore be 1.4 volts. The offset signal will be nonzero as long as the $A_0$ reading is greater than 1.4 volts. The offset signal will be nulled; that is, the offset signal will be zero at an actual $A_0$ signal reading of 1.4 volts. At the time when the offset signal is nulled, the control element 160 will check to determine that the $A_0$ reading is the desired one i.e. 1.4 volts. Assuming that the $A_0$ reading is determined to be 1.4 volts, the step of moving the data head one-half track distant inwardly is completed.

It will be recognized that offset values greater than 1.4 volts can be used so that the offset signal is nulled prior to reaching the desired $A_0$ signal level of 1.4 volts. In other words, a series of ideal offset voltage values is iteratively generated so that the offset signal is nulled several times as the carriage 22 progressively approaches the ultimately desired position where the $A_0$ signal is 1.4 volts.

The next step is that of writing a set of data information $X_0$ 162 on the data side 16b of the disk 16. This data information $X_0$ 162 will be written one-half track space inwardly from the servo set of information $A_0$ 158, as depicted in FIG. 14.

The servo head 20 is now moved to locate it approximately one-half track radially inwardly from the point at which the data information 88 has been written. This is accomplished by first reading the data information $X_0$ 162, setting a data automatic gain control level to 1.28 volts and holding this data automatic gain control level. Then an ideal offset voltage value is generated for the data side 16b. The value in this case is 0.48 volts since, as already noted, a half track displacement is equivalent to a loss of 0.8 volts of the $A_0$ signal; therefore, 1.28 volts minus 0.8 volts equals 0.48 volts as the ideal offset voltage value on the data side 16b. Ideal offset voltage values can be generated for both the servo side 16a and the data side 16b, but the exact positioning of the carriage 22 is done by reading servo information. The carriage 22 is displaced to the point at which the data head reads 0.48 volts of the $X_0$ signal.

The difference between the $X_0$ signal and the offset signal is now nulled until the servo $A_0$ output equals 0.60 volts, a movement of one complete track as shown in FIG. 15 (from servo information $A_0$ 158 to a set of servo information $B_0$ 164). The data offset should be held, and at this point, the voltages can be computer adjusted to compensate for the servo head 20 dimension and the skew angle of the servo head 20 relative to the perfectly circumferential track.

The next several steps in the process are as follows: write servo information $B_0$ 164, a second phase, (servo track No. 1) on the servo side 16a as shown in FIG. 16; read the servo $B_0$ signal, set the servo automatic gain control to 2.2 volts and hold the servo automatic gain control level; null the difference of the servo $B_0$ minus the offset signal until the servo $B_0$ output equals 1.40 volts as shown in FIG. 17, and hold the servo offset; write a set of data information $Y_0$ 166 of the second phase on the data surface 166 as shown in FIG. 18; read the data $Y_0$ signal, set the data automatic gain control level to 1.28 volts on the data $Y_0$ signal, and hold the data automatic gain control; null on the difference between the data $Y_0$ signal and the offset signal until servo $B_0$ output equals 0.60 volts as shown in FIG. 19, and hold the data offset; write a set of servo information $C_0$ 168, of a third phase (servo track No. 2) on the servo side 16a as depicted in FIG. 20; read the servo $C_0$ signal, set the servo automatic gain control level to 2.2 volts of the servo $C_0$ signal and hold the servo automatic gain control level; null on the difference of the servo $C_0$ signal and the offset signal until the servo $C_0$ output equals 1.40 volts as depicted in FIG. 21, and then hold the servo offset; write a set of data information $Z_0$ 170 of the third phase on the data surface 16b as shown in FIG. 22; read the data $Z_0$ signal, set the data automatic gain control level to 1.28 volts of the data $Z_0$ signal and hold the data automatic gain control level; null on the difference of the data $Z_0$ signal and the offset signal until the servo $C_0$ output equals 0.60 volts, and then hold the data offset as depicted in FIG. 23; and write a set of servo information $A_1$ 172 of the first phase (servo track No. 3) on the servo side 16a as depicted in FIG. 24.

The above process steps are repeated cyclically (with the exception of biasing and clocking) until the last servo track has been written on the inner diameter on the servo side 16a of the disk 16. If the desired number of servo tracks has been written, the data patterns can be erased. If the desired number of servo tracks has not been written, each data and servo track can be erased in reverse order of the order in which they were written and the process begun again, with compensation made for the track spacing, to achieve the desired number of servo tracks. The entire process can be repeated iteratively until the desired number of servo tracks is achieved.

To make the reverse order of erasure more effective, a second disk (not shown) can be used with sets of data information on both sides of the second disk using the same gap width and pattern width as on the original data side of the original disk 16. Also, the desired number of servo tracks without using the iterative process described above can be achieved by using precise gap widths on the servo head 20 to get precise measurements for the servo track spacing. Another solution is to incorporate computer calculations for the skew angle between the servo head 20 and the servo track as hereinbefore mentioned.

The above described technique for electronically positioning a transducer 20 during the laying of servo tracks can also be used in a system where the mode of reading and writing information is optical rather than magnetic. Those of ordinary skill in the art will readily understand the modifications of the present invention necessary for such a mode change. Such modifications are within the scope of the present invention.

The present invention can be practiced in connection with recording media other than magnetic disks. For example, in any medium capable of assuming two distinguishable states or conditions, including, but not limited to optical systems, servo patterns can be formed in the recording medium as longitudinal arrays, with neighboring longitudinal arrays consisting or servo patterns longitudinally offset from one another.

It will be clear that the present invention is well adapted to carry out the objects and attain the advantages mentioned as well as those inherent therein. While a presently preferred embodiment of the invention has been described for the purposes of this disclosure, numerous changes can be made which will readily suggest themselves to those skilled in the art and which are encompassed within the spirit of the invention disclosed and as defined in the appended claims.

What is claimed is:

1. A method of writing magnetic servo information on a magnetic medium, the method comprising:

writing a first set of servo information on a first side of the magnetic medium, using a first transducer proximate the first side of the medium, the first set of information being written near the outer periphery;

reading a voltage amplitude associated with a selected portion of the first set of servo information;

writing a first set of data information on a second side of the magnetic medium, using a second transducer proximate the second side of the medium, the first set of data information being written near the outer periphery but having a smaller radius from the center of the magnetic medium than the first set of servo information, the smaller radius being determined by reading a fraction of the voltage amplitude associated with the selected portion of the first set of servo information;

reading a voltage amplitude associated with a selected portion of the first set of data information;

writing a second set of servo information on the first side of the magnetic medium, using the first transducer, the second set of servo information being written at a smaller radius from the center of the magnetic disk than either the first set of servo information or the first set of data information, the smaller radius being determined by reading a fraction of the voltage amplitude associated with the selected portion of the first set of data information; and repeating the hereinbefore described steps for a plurality of sets of servo information and data information.

2. The method of claim 1 wherein each set of servo information is written in a concentric track and each track is equidistantly radially spaced from the next track.

3. The method of claim 2 wherein each set of servo information is further divided into subsets and each subset is equidistantly angularly spaced from the next subset on the track.

4. The method of claim 1 wherein the first set of servo information is written close to the inner diameter of the magnetic medium and each successive set of servo and data information is written at a greater radius than the previous set.

5. The method of claim 1 wherein the number of phases is three (3).

6. The method of claim 1 wherein each fraction of voltage amplitude is adjusted for any skew angle between the selected portion of information and a transducer which reads and writes the information.

7. The method of claim 2 wherein the desired total number of servo tracks is preselected and if that number is not achieved the fraction of voltage amplitude and the radial track dimension are appropriately adjusted, all sets of servo and data information are erased and the method is repeated iteratively until the desired total number of servo tracks is achieved.

8. The method of claim 7 wherein the magnetic medium is a first disk for receiving the servo and data information and wherein a second disk also receives the data information so that if erasure of the first disk is required, the data information on the second disk is used for that purpose.

9. The method of claim 2 wherein the desired total number of servo tracks is preselected, the radial gap dimension of the transducer is measured, and the fraction of voltage amplitude is appropriately adjusted to achieve the total number of servo tracks.

10. The method of claim 1 wherein each step of writing set of servo information is further characterized as comprising the writing of a selected servo pattern having a width greater than the spacing between successive sets of servo information.

* * * * *

UNITED STATES PATENT AND TRADEMARK OFFICE
CERTIFICATE OF CORRECTION

PATENT NO. : 4,912,576

DATED : March 27, 1990

INVENTOR(S) : Donald W. Janz

It is certified that error appears in the above-identified patent and that said Letters Patent is hereby corrected as shown below:

On Title Page: - [56] References Cited, U.S. Patent Documents, insert the following three references:

```
--3,185,972   5/1965    Sippel................340/174.1
  3,864,740   2/1975    Sordello et al. ......360/77
  4,414,589  11/1983    Oliver et al. ........360/77--;
```

Cover Sheet (column 2) - [56] References Cited, Other Publications, last line of references before naming of Examiners and Attorney, delete "H. K. Schaller" and substitute therefor --K. H. Schaller--;

Column 4, line 30, after "data" insert a hyphen (-- - --);

Column 7, line 29, delete "zerolevel" and substitute therefor --zero level--;

Column 10, line 60, after "circuitry" and before "will" insert --98--; and

Column 11, line 5 delete "Lis" and substitute therefor --110 is--.

UNITED STATES PATENT AND TRADEMARK OFFICE
CERTIFICATE OF CORRECTION

PATENT NO. : 4,912,576
DATED : March 27, 1990
INVENTOR(S) : Donald W. Janz

It is certified that error appears in the above-identified patent and that said Letters Patent is hereby corrected as shown below:

Column 1, lines 4 and 5, delete "TRI-PHASE SERVO PATTERNS" and substitute therefor --METHOD FOR WRITING A SERVO PATTERN--; and Column 14, line 33, delete the word "or" and substitute therefor --of--.

Signed and Sealed this

Fourth Day of August, 1992

Attest:

DOUGLAS B. COMER

*Attesting Officer*   *Acting Commissioner of Patents and Trademarks*